Oct. 27, 1959  KARL-HEINZ ARENHOLD  2,910,324
COMBINATION FLUID PRESSURE AND VACUUM BRAKE SYSTEM
Filed Feb. 8, 1957
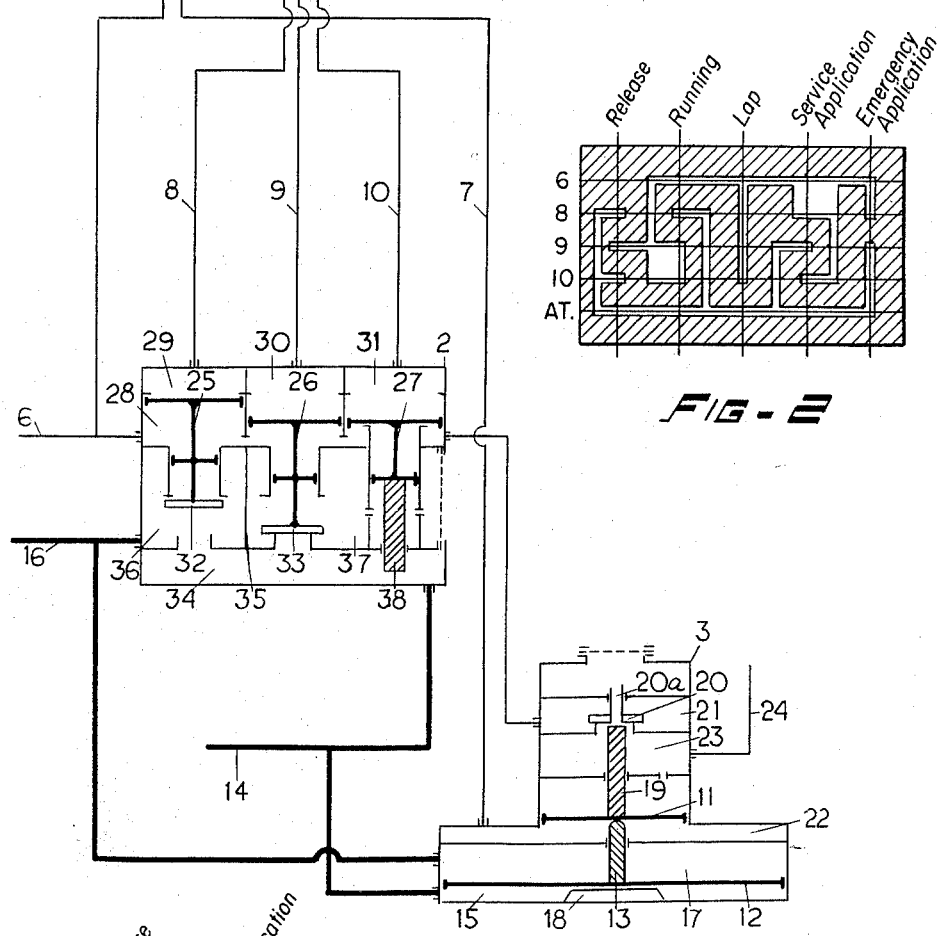
INVENTOR.
Karl-Heinz Arenhold
BY
Adelbert A. Steinmiller
ATTORNEY

United States Patent Office 2,910,324
Patented Oct. 27, 1959

2,910,324
COMBINATION FLUID PRESSURE AND VACUUM BRAKE SYSTEM

Karl-Heinz Arenhold, Heidenheim (Brenz), Germany, assignor to Westinghouse-Bremsen-Gesellschaft m.b.H., Hannover, Germany Application February 8, 1957, Serial No. 639,070

Claims priority, application Germany March 8, 1956

10 Claims. (Cl. 303—4)

This invention relates to combination fluid pressure and vacuum brake apparatus, and more particularly to apparatus of the above type adapted to control brakes on a prime mover, such as a railway locomotive, on the fluid pressure principle while concurrently controlling brakes on a hauled vehicle, such as a railway car, on the vacuum principle.

In Germany, as well as in most European countries and in the United States, it is the general practice to use pneumatic pressure as the brake operating medium for controlling brakes on a locomotive and the connected cars of a train either on the straight-air or automatic principle; whereas, in contrast, it is customary in India, Egypt, South Africa, Spain and Portugal to control brakes on railway cars on the vacuum principle.

In those countries where vacuum brake apparatus is employed, it is customary to equip the locomotive with a direct-operating pneumatic brake apparatus and to brake only the attached railway cars by means of vacuum brake apparatus. This arrangement is employed because large brake cylinders are required with vacuum brake equipment to get the necessary braking force due to the comparatively small range in brake pipe operating vacuum (of about 1 pound per square inch absolute to atmospheric pressure), and such large brake cylinders cannot be readily accommodated on the locomotive due to space limitations.

With combination fluid pressure and vacuum brake apparatus of the type above described, it is customary to provide on the locomotive an engineer's vacuum brake valve and also a vacuum-operated pneumatic valve that, in turn, controls operation of a brake controlling valve for controlling application and release of the fluid pressure brakes on the locomotive and the vacuum brakes on the connected cars of the train. With such apparatus, installation of the engineer's vacuum brake valve is extremely difficult because of the large-size pipe (inside diameter of about 2") needed for all vacuum connections, the difficulty in connecting such large pipe to a brake valve mounted in a fixed positon, and the small amount of available space in the vicinity of the engineer's vacuum brake valve.

It is therefore one object of this invention to provide an improved combination fluid pressure and vacuum brake apparatus for a locomotive, embodying an engineer's brake valve device which indirectly through a relay valve device (instead of directly) controls vacuum destruction and restoration of vacuum in the vacuum brake pipe, said brake valve device effecting variations in "positive" pneumatic pressure, for therefore eliminating the difficulties just described by permitting small diameter (¼") flexible tubing to be exclusively connected to the engineer's vacuum brake valve, as well as to the independent brake valve, for facilitating installation of the apparatus. The term "positive" pneumatic pressure, as herein used, is intended to refer to atmospheric pressure or superatmospheric pressure, as distinguished from a sub-atmospheric or vacuum pressure.

According to this object, the engineer's vacuum brake valve effects variations in positive pneumatic pressure in a plurality of pipes for thereby remotely controlling operation of a relay valve comprising three independently operable valves that, in turn, control increase and decrease in pressure in the vacuum brake pipe as well as the flow rate between the vacuum reservoir and vacuum brake pipe and between the atmosphere and vacuum brake pipe.

Another object is to provide, in a combination brake apparatus of the type above described, a brake controlling valve which responds to destruction in vacuum in the vacuum brake pipe relative to the vacuum in the vacuum reservoir, while an independent application and release pipe is vented, to effect supply of fluid under pressure from a super-atmospheric pressure source to the locomotive brake cylinders for providing therein fluid at a pressure proportionate to the degree of such destruction in vacuum, and which brake controlling valve responds to charging of the independent application and release pipe, while the vacuum in the vacuum brake pipe is equal to that in the vacuum reservoir, to effect supply of fluid under pressure from said pressure source to the locomotive brake cylinders for providing therein fluid at a pressure corresponding to the degree of pressurization of the independent application and release pipe.

Other objects and advantages will become apparent from the following more detailed description of the invention and from the accompanying drawing, wherein Fig. 1 is a schematic view of a combination fluid pressure and vacuum brake apparatus embodying the invention; Fig. 2 is a sectional development view showing the respective connections effected by an automatic brake valve of Fig. 1 in its various positions; and Fig. 3 is a sectional development view showing the respective connections effected by an independent brake valve of Fig. 1 in its various positons.

Description

As shown in the drawing, the brake apparatus embodying the invention comprises an engineer's brake valve device 1, a pneumatically-controlled relay valve device 2, and a brake controlling valve device 3.

The engineer's brake valve device 1 comprises a preferably unitary sectionalized casing containing a rotary-type independent brake valve 4 for controlling, through the medium of valve device 3, fluid pressure brakes on the locomotive independently of those on the connected cars of a train, and also containing a rotary-type automatic brake valve 5 for controlling operation of the relay valve device 2 to thereby control vacuum brakes on the connected cars of a train while, through the medium of valve device 3, concurrently controlling fluid pressure brakes on the locomotive.

The independent brake valve 4 controls the pressure of fluid in an independent application and release pipe 7; said brake valve being operable to selectively vent said pipe, lap fluid pressure in said pipe, or connect said pipe to a pipe 6 leading to a main reservoir (not shown) containing air at a relatively high super-atmospheric pressure. According to a feature of the invention, the automatic brake valve 5 controls positive pneumatic pressures in three control pipes 8, 9 and 10 leading to control chambers 29, 30 and 31, respectively, of relay valve device 2, for reasons hereinafter to be explained.

According to the invention, the relay valve device 2 comprises three independently operable differential pistons 25, 26 and 27 arranged side-by-side within a sectionalized casing and each constantly subject on the adjacent faces of its respective larger and smaller pistons to main reservoir pressure in a common chamber 28 open to a branch of main reservoir pipe 6. The opposite faces of the larger pistons of the differential pistons 25, 26 and 27 are subject to fluid pressure in chambers 29, 30 and 31, respectively. The opposite face of the smaller piston of differential piston 25 is constantly subject to vacuum in a chamber 36 open via a pipe 16 to a vacuum reservoir (not shown). The opposite faces of the smaller pistons of the differential pistons 26 and 27 are constantly subject to atmospheric pressure in a common atmospheric chamber 37 that is separated from chamber 36 by a casing partition 35.

To the smaller piston of differential piston 25 there is positively connected, by a coaxially arranged stem in chamber 36, a disc-shaped vacuum supply valve 32 that controls connection of vacuum reservoir pipe 16 with a chamber 34 constantly open to a vacuum brake pipe 14; said valve 32 being seatable against a suitable annular valve seat rib formed in the end wall of chamber 36 for preventing such connection. To the smaller piston of differential piston 26 there is positively connected, by a coaxially arranged stem in chamber 37, a disc-shaped vent valve 33 that controls connection of chamber 34 with atmospheric chamber 37; said valve 33 being seatable against a suitable annular valve seat rib formed in the end wall of chamber 37. To the smaller piston of differential piston 27 there is positively connected a movable baffle plate or throttle-slide 38 which, intermediate its ends, has sealing, slidably guided contact with the wall of an opening through the end wall of chamber 37 and projects into chamber 34 at a point intermediate the vacuum brake pipe 14 and the valve seat ribs for valves 32 and 33, for controlling flow rate between the vacuum brake pipe 14 and either the vacuum reservoir pipe 16 or atmospheric chamber 37, for reasons hereinafter to be described.

According to the invention, the brake controlling valve device 3 comprises two coaxially arranged pistons 11 and 12 of different diameters slidably mounted in a sectionalized casing. The larger piston 12 is subject, at its side farthest from the smaller piston 11, to vacuum in a chamber 15 constantly open to a branch of vacuum brake pipe 14 and is subject at the opposite side to vacuum in a chamber 17 constantly open to a branch of vacuum reservoir pipe 16. Coaxially attached to the larger piston 12 is a ram 13 which, intermediate its ends, has sealing, slidably guided contact with the wall of an aligned bore through a casing partition separating chamber 17 from a chamber 22 open to pipe 7; said ram at its unattached end being adapted to engage one side of the smaller piston 11 for transmitting force thereto. To the opposite side of smaller piston 11 is coaxially attached a ram 19 that projects through a chamber 23 and at its projecting end is adapted to abuttingly engage a double-seating, annular disc-shaped valve 20 contained in a supply chamber 21 constantly connected via a suitable pipe to chamber 28. Valve 20 is normally seated against an annular seat rib formed in the end wall of chamber 21 in encirclement of an opening through a casing partition separating the chambers 21 and 23, for preventing fluid flow from chamber 21 to chamber 23. Coaxially connected to the annular valve 20 in encirclement of the central opening therethrough is a sleeve which extends through chamber 21 and has, intermediate its ends, sealing, slidably guided contact with the wall of an aligned bore through a casing partition separating chamber 21 from an atmospheric chamber; the bore of said sleeve cooperating with said central opening to define a vent passage 20a via which chamber 23 is opened to atmosphere when the ram 19 is disengaged from the valve 20.

Operation

Assume initially that the main reservoir pipe 6 is charged with fluid under pressure; that the vacuum reservoir pipe 16 is connected to an evacuated vacuum reservoir (not shown); that the independent brake valve 4 is in a release position, denoted by the legend "R," in which it is shown; and that the brake valve 5 is in a running position, in which it is shown.

With independent brake valve 4 in release position (Fig. 3), main reservoir pipe 6 is lapped at the brake valve, and independent application and release pipe 7 is opened to atmosphere. With automatic brake valve 5 in running position (Fig. 2), the pipe 8, and hence relay chamber 29, is connected to atmosphere; and pipes 9 and 10, and hence relay chambers 30 and 31, are connected to the main reservoir pipe 6. With chamber 29 vented and chamber 28 charged to main reservoir pressure, such pressure acting on the net effective area of differential piston 25 will urge said differential piston to an upper position, in which it is shown, and in which the valve 32 is unseated for connecting the vacuum reservoir pipe 16 to the vacuum brake pipe 14 for thereby permitting equalization of vacuum in said pipes and causing the vacuum brakes on the connected cars of a train to be released in the well-known manner. With both faces of the larger pistons of the differential pistons 26 and 27 subjected to main reservoir pressure, such pressure will be effective in chamber 28 on the corresponding smaller pistons to urge the differential pistons 26 and 27 to respective lower positions, in which they are shown, and in which valve 33 is seated for disconnecting the vacuum brake pipe 14 from atmosphere and the throttle-slide 38 is positioned to partially obstruct communication between chamber 34 and vacuum brake pipe 14 and thereby provide restricted flow between the pipes 14 and 16 past unseated valve 32.

Since piston 12 of brake controlling valve device 3 has the same vacuum acting on its opposing faces (because pipe 16 is open to pipe 14 past the unseated valve 32), said piston will be positioned as shown (either by gravity or if necessary with the assistance of a light helical bias spring, not shown, in chamber 17), such that piston 12 contacts a suitable stop 18 provided in the end wall of chamber 15. With chamber 22 vented via the vented pipe 7 and no thrust being exerted by the ram 13 on the smaller piston 11, said piston will be positioned as shown (either by gravity or if necessary by a light helical bias spring, not shown, in chamber 23), such that ram 19 is disengaged from valve 20, for thereby connecting to atmosphere (via the vent passage 20a) the chamber 23 and thereby a brake cylinder pipe 24 leading to the locomotive brake cylinders (not shown), for thereby defining a brake release position of the valve device 3.

Hence, under the assumed conditions, brakes will be released on the locomotive and connected cars of the train, and the various components of the brake apparatus will assume the respective positions in which they are shown in the drawing.

To effect a service application of brakes on the locomotive in unison with those on the connected cars, the brake valve 5 is operated to a service application position (Fig. 2) for charging pipe 8 from main reservoir pipe 6, venting pipe 9 and maintaining pipe 10 charged from pipe 6. According to the invention, this charging of pipe 8 and hence of chamber 29 will cause the differential piston 25 to be shifted to lower position for operatively seating valve 32 to cut off the vacuum reservoir pipe 16 from the vacuum brake pipe 14. Venting of pipe 9 and hence of chamber 30 will cause the differential piston 26 to be shifted to upper position by main reservoir pressure in chamber 28, for operatively unseating valve 33 and thereby permitting air at atmospheric pressure to flow, at the restricted rate controlled by throttle-slide 38 in its partially obstructing or flow-restricting position, from atmospheric chamber 37 to the vacuum brake pipe 14, for initiating a brake application on the cars in the conventional manner. When vacuum in the vacuum brake pipe 14 has been destroyed to an extent corresponding to the degree of brake application desired, the brake valve 5 is operated to lap position (Fig. 2), in which pipes 8, 9 and 10 are connected to main reservoir pipe 6, for thereby causing the valve 32 to be maintained seated, the valve 33 to be seated, and the throttle-slide 38 to be maintained in its partially obstructing or flow-restricting position; whereupon air will be bottled up in the vacuum brake pipe 14 at the desired value of partial vacuum.

Meanwhile, as pressure in the vacuum brake pipe 14 and hence in chamber 15 of valve device 3 increases relative to the constant vacuum in chamber 17, the piston 12 will move upwardly and via ram 13 shift piston 11 to thereby carry the ram 19 into abutting contact with valve 20 for sealing off vent passage 20a from chamber 23 and then, through such contact, unseating valve 20 from its valve seat rib for permitting main reservoir air to flow from chamber 21 past unseated valve 20 to chamber 23 and thence via pipe 24 to the locomotive brake cylinders. Such flow to the locomotive brake cylinders will continue until brake cylinder pressure, as noted in chamber 23 and effective on the upper face of smaller piston 11, has increased to a value where it is just sufficient to urge the piston stack 11, 13, 12 downwardly against opposition of the net effective force acting on piston 12 and corresponding to the vacuum differential across the faces of piston 12; whereupon the valve 20 will be seated by main reservoir pressure in chamber 21 (assisted, if desired by a light bias spring, not shown, in chamber 21) for cutting off flow of main reservoir air to the locomotive brake cylinders, and the end of ram 19 will engage valve 20 for sealing off vent passage 20a from chamber 23, thereby defining a lap position of valve device 3 in which air in the locomotive brake cylinders will be bottled up at a value directly proportionate to the operator-effected increase in vacuum brake pipe pressure.

To effect an emergency application of brakes on the locomotive and connected cars, the brake valve 5 is operated to an emergency position (Fig. 2), in which the pipe 8 is charged with main reservoir air and pipe 9 is vented (the same as in service application position), but pipe 10 is vented for causing the differential piston 27 to move to upper position to thereby retract the throttle-slide 38 so that it will not obstruct flow for thereby permitting atmospheric air to flow at a substantially unrestricted rate from chamber 37 past the then unseated valve 33 to vacuum brake pipe 14. Hence, during an emergency application, the application of brakes will be initiated more promptly on both the locomotive and cars than obtained during a service application; and since the vacuum brake pipe 14 will be rapidly charged to atmospheric pressure, the degree of application will correspond to that obtained with a full service application of brakes.

To effect a relatively rapid initiation of a brake release on the locomotive and connected cars, the brake valve 5 is operated to a release position (Fig. 2), in which pipe 8 is vented for causing differential piston 25 to operatively unseat valve 32 and pipe 9 is charged for causing differential piston 26 to operatively seat valve 33 (the same as in running position heretofore described); but pipe 10 is vented for causing differential piston 27 to move throttle-slide 38 to its retracted position. Under this condition, the vacuum reservoir pipe 16 will be in substantially unrestricted communication with the vacuum brake pipe 14 because valve 32 is unseated and throttle-slide 38 is retracted; and hence the vacuum brake pipe 14 will be evacuated at a relatively fast rate for thereby causing a more prompt initiation of a release of brakes on the cars, as well as on the locomotive by operation of the valve device 3 in the manner hereinafter to be described.

If a less prompt release of brakes on the locomotive and connected cars is desired, the brake valve 5 is operated to running position (Fig. 2), in which pipe 8 is vented and pipe 9 is charged to main reservoir pressure (as in release position) but pipe 10 is vented for causing the throttle-slide 38 to partially obstruct and thereby restrict communication between vacuum reservoir pipe 16 and vacuum brake pipe 14 for evacuating the latter at a slower rate.

As the vacuum brake pipe 14 and hence chamber 15 is evacuated, brake cylinder pressure in chamber 23 acting on the smaller piston 11 will be effective to shift the piston stack 11, 13, 12 downwardly, causing the valve device 3 to assume its previously defined brake release position, in which ram 19 is disengaged from valve 20 for opening the chamber 23 and hence the locomotive brake cylinders to atmosphere via vent passage 20a, while valve 20 is seated against the valve seat rib in chamber 21 for preventing flow of main reservoir air to chamber 23.

It will thus be seen that if a partial release of brakes is desired, vacuum in brake pipe 14 may be partially restored and the brake valve 5 then moved to lap position (Fig. 2) for bottling up vacuum in pipe 14 at a desired pressure greater than vacuum reservoir pressure for thereby causing the valve device 3 to release brake cylinder pressure in chamber 23 to a value proportionate to the differential in vacuum in the pipes 16 and 14, and then move to lap position for bottling up locomotive brake cylinder pressure at such value; whereas if a complete release of brakes is desired, the vacuum brake pipe is evacuated to equality with vacuum reservoir pressure, in which case the valve device 3 will remain in its brake release position for completely releasing locomotive brakes.

To effect an application of brakes on the locomotive independently of those on the connected cars, the independent brake valve 4 is moved from release position to application position (denoted by the legend A) for charging the pipe 7 from main reservoir pipe 6 (see Fig. 3) to a desired pressure above atmospheric corresponding to the degree of independent application desired; whereupon the brake valve 4 is operated to lap position (denoted by the legend L) to bottle up air in pipe 7 at said desired pressure (see Fig. 3). According to the invention, since no change in vacuum brake pipe pressure is thus effected, the piston 12 of valve device 3 will remain stationary, but fluid pressure supplied via pipe 7 to chamber 22 will shift the smaller piston 11 upwardly for operatively unseating the valve 20 and suppplying air to the locomotive brake cylinders via chamber 23 until brake cylinder pressure, as noted in chamber 23, slightly exceeds that in chamber 22; whereupon piston 11 will be shifted downwardly permitting valve 20 to seat while ram 19 engages valve 20 for sealing off vent passage 20a from chamber 23, with the result that air in the locomotive brake cylinders will be bottled up at a pressure corresponding to the operator-selected pressure provided in pipe 7. To release an independent application of locomotive brakes, the brake valve 4 is moved to release position (Fig. 3) for venting pipe 7 and hence chamber 22 to atmosphere.

It will be apparent that when the automatic brake valve 5 has been operated to provide an application of brakes on the locomotive and cars, the degree of brake application may be independently increased on the locomotive, according to the invention, by operating independent brake valve 4 to supply air to pipe 7 and thereby increase the upward force acting on the piston stack 11, 13, 12, so that the valve device 3 will move to its lap position only after locomotive brake cylinder pressure as noted in chamber 23 has increased to a value corresponding to the combined effects of vacuum brake pipe pressure increase and the pressure in chamber 22.

According to another feature of the invention, in event of pull-apart or a train line emergency (such as caused by the conductor venting the vacuum brake pipe 14 on one of the cars) while the brake valve 5 is in running position (Fig. 2), the differential piston 27 will be in lower position for maintaining throttle-slide 38 in its flow-restricting position; and hence brakes will be applied on the locomotive and connected cars at a service rate and to an extent corresponding to a full service application (since vacuum in the vacuum brake pipe 14 will be completely destroyed), so as to prevent the shock which would otherwise be caused if brakes were applied at an emergency rate.

Having now described the invention, what I claim as new and desire to secure by Letters Patent, is:

1. A combination fluid pressure and vacuum brake apparatus for controlling brakes on a locomotive on the pneumatic principle and controlling brakes on the connected cars of a train on the vacuum principle according to variations in vacuum in a vacuum brake pipe, said apparatus comprising, in combination with a vacuum source and a fluid pressure source, a pair of control pipes, a relay valve device controlled by pressure of fluid in said control pipes and responsive to concurrent venting of one of said control pipes and charging of the other of said control pipes with fluid at a super-atmospheric pressure to open the vacuum source to the vacuum brake pipe for evacuating the latter while closing off the vacuum brake pipe from the atmosphere, responsive to concurrent charging of said one control pipe with fluid at a super-atmospheric pressure and venting of said other control pipe to close off the vacuum source from the vacuum brake pipe while opening the latter to the atmosphere, and responsive to concurrent charging of said control pipes with fluid at a super-atmospheric pressure to close off the vacuum brake pipe from both the vacuum source and the atmosphere for bottling up fluid in the vacuum brake pipe, a locomotive brake cylinder pipe, and brake controlling valve means for the locomotive responsive to equalization of vacuum in the vacuum brake pipe with that in the vacuum source to vent the locomotive brake cylinder pipe, and responsive to a subsequent chosen increase in vacuum brake pipe pressure to supply fluid under pressure from said fluid pressure source to said locomotive brake cylinder pipe for providing in the latter fluid at a pressure proportionate to said chosen increase, and responsive to a subsequent partial evacuation of the vacuum brake pipe to effect a release of locomotive brake cylinder pipe pressure to an extent proportionate to the extent of such partial evacuation.

2. A combination fluid pressure and vacuum brake apparatus for controlling brakes on a locomotive on the pneumatic principle and controlling brakes on the connected cars of a train on the vacuum principle according to variations in vacuum in a vacuum brake pipe, said apparatus comprising, in combination with a vacuum source and a fluid pressure source, a relay valve device comprising two independently operable valves each controlled by fluid pressure in a corresponding control chamber, said valves being operable responsively to concurrent charging of both of said control chambers to cut off the vacuum brake pipe from both the vacuum source and the atmosphere, responsive to venting of one of said control chambers and while the other of said control chambers is charged to open the vacuum source to the vacuum brake pipe while maintaining the latter closed off from atmosphere, and responsive to charging of said one control chamber and venting of said other control chamber to cut off the vacuum source from the vacuum brake pipe and open the latter to atmosphere, and operator-controlled brake valve means for selectively or concurrently connecting said control chambers to atmosphere or to said fluid pressure source for controlling venting and charging thereof and thereby controlling vacuum in the vacuum brake pipe by controlling operation of the relay valve device.

3. The combination according to claim 2, wherein said relay valve device comprises a third control chamber and means operative to selectively provide a restriction to flow between the vacuum brake pipe and both of said valves or to provide substantially no restriction to such flow according to whether said third control chamber is charged or is vented, and wherein said operator-controlled brake valve means as an incident to its operation also connects said third control chamber to atmosphere or to said fluid pressure source for controlling pressure of fluid therein.

4. The combination according to claim 2, including a locomotive brake cylinder pipe, and self-lapping brake controlling valve means controlled by locomotive brake cylinder pipe pressure opposing the net effective pressure corresponding to differential in pressures in the vacuum brake pipe and vacuum source, said brake controlling valve means being responsive to equalization of vacuum in the vacuum brake pipe and vacuum source to vent said brake cylinder pipe and responsive to a chosen increase in vacuum brake pipe pressure relative to vacuum source pressure to provide in said brake cylinder pipe fluid at a pressure proportionate to the extent of said chosen increase.

5. A combination fluid pressure and vacuum brake apparatus for controlling brakes on a locomotive on the pneumatic principle and controlling brakes on the connected cars of a train on the vacuum principle according to variations in vacuum in a vacuum brake pipe, said apparatus comprising, in combination with a vacuum source and a fluid pressure source, two independently operable differential pistons each constantly subject intermediate its respective larger and smaller pistons to pressure in said fluid pressure source, each of the larger pistons being subject at its respective opposite side to fluid pressure in a corresponding control chamber, and a valve controlled by each differential piston and each such valve being operable by its differential piston to an open position or a closed position according as its corresponding control chamber is vented or charged with fluid under pressure, one of said valves controlling connection of the vacuum source with the vacuum brake pipe, and the other of said valves controlling connection of the vacuum brake pipe with the atmosphere, and brake valve means operable to a plurality of positions for concurrently connecting the control chambers to the fluid pressure source or selectively connecting the control chambers to the atmosphere.

6. The combination according to claim 5, including a third independently operable differential piston constantly subject intermediate its respective larger and smaller pistons to pressure in said fluid pressure source, the larger piston of said third differential piston being subject at the opposite side to pressure of fluid in a third control chamber, and means operatively connected to said third differential piston and rendered ineffective or effective to provide a restriction to flow between the vacuum brake pipe and said valves according as the third control chamber is vented or is charged with fluid under pressure, said brake valve means being operable in some of its said positions to vent said third control chamber and in the other of its said positions to charge said third control chamber with fluid under pressure from said fluid pressure source.

7. In a combination fluid pressure and vacuum brake apparatus for controlling brakes on a locomotive and connected cars of a train, the combination of a normally vented independent application and release pipe that is chargeable with fluid under pressure for causing an independent application of locomotive brakes, a normally vented locomotive brake cylinder pipe, a vacuum source, a vacuum brake pipe normally evacuated to a vacuum equal to that in the vacuum source and in which absolute pressure is increased for causing an application of car brakes, and brake controlling valve device for the locomotive comprising valve means and two coaxially arranged movable abutments, one of which is subject to opposing fluid pressures in the brake cylinder pipe and independent application and release pipe and the other of which is subject to absolute pressure in the vacuum source opposing absolute pressure in the vacuum brake pipe for controlling operation of said valve means, said valve means being operative responsively to venting of the independent application and release pipe and equalization of vacuum in the vacuum source and vacuum brake pipe to vent the locomotive brake cylinder pipe, and responsively to a chosen subsequent increase in absolute pressure in the vacuum brake pipe while the independent application and release pipe is vented to provide in said locomotive brake cylinder pipe fluid at a super-atmospheric pressure proportional to said chosen increase, and also responsive to charging of said independent application and release pipe to a selectable pressure while vacuum in the vacuum brake pipe is equal to that in the vacuum source to provide fluid in said locomotive brake cylinder pipe at a super-atmospheric pressure corresponding to said selectable pressure.

8. In a combination fluid pressure and vacuum brake apparatus for controlling brakes on a locomotive and connected cars of a train, the combination of a normally vented independent application and release pipe that is chargeable with fluid under pressure for causing an application of locomotive brakes, a normally vented brake cylinder pipe for the locomotive, a fluid pressure source, a vacuum source, a vacuum brake pipe normally evacuated to a vacuum equal to that in the vacuum source and in which vacuum is destroyed for causing an application of car brakes, and brake controlling valve means for the locomotive comprising two coaxially arranged movable abutments of different effective areas, means impositively conecting said movable abutments for permitting movement thereof as a stack, the larger of said movable abutments being subject to vacuum brake pipe pressure opposing vacuum source pressure, and the smaller of said movable abutments being subject to independent application and release pipe pressure opposing brake cylinder pipe pressure, double-seating valve means for controlling a fluid pressure supply communication between said fluid pressure source and the brake cylinder pipe and controlling a fluid pressure vent communication from said brake cylinder pipe to atmosphere, said stack being operable responsively to destruction in vacuum in the vacuum brake pipe while the independent application and release pipe is vented to cause operation of said double-seating valve means to open said supply communication until pressure in said brake cylinder pipe has increased to a value proportionate to the extent of such destruction in vacuum and then permit seating of said double-seating valve means to close said supply communication, and said stack being operable responsively to a subsequent evacuation of the vacuum brake pipe to effect opening of the vent communication for reducing brake cylinder pipe pressure to an extent corresponding to the extent of such evacuation, said smaller movable abutment being operable independently of the larger movable abutment responsively to charging of said independent application and release pipe while vacuum in the vacuum brake pipe is equal to that in the vacuum source to cause operation of said double-seating valve means to open the supply communication until pressure in said brake cylinder pipe has increased to a value corresponding to the pressure provided in said independent application and release pipe and then permit seating of said double-seating valve means to close said supply communication, said smaller movable abutment being operable responsively to a subsequent reduction in pressure in said independent application and release pipe to effect opening of the vent communication for reducing brake cylinder pipe pressure to an extent corresponding to the extent of such reduction.

9. A combination fluid pressure and vacuum brake apparatus for a locomotive and connected cars of a train comprising, in combination, a vacuum brake pipe normally evacuated to a preselected vacuum for causing a release of brakes on the cars, an independent application and release pipe normally vented and chargeable with fluid at a pressure corresponding to the degree of independent application of locomotive brakes desired, a brake cylinder pipe for the locomotive, and brake controlling valve means for the locomotive comprising valve means normally venting the brake cylinder pipe and also comprising a plurality of impositively connected, coaxially arranged movable abutments which are operable as a stack responsively to a chosen increase in vacuum brake pipe pressure above said preselected vacuum, while said independent application and release pipe is vented, for causing operation of said valve means to provide in said brake cylinder pipe fluid at a pressure proportionate to said chosen increase, one of said movable abutments being subject opposingly to brake cylinder pipe pressure and independent application and release pipe pressure and operable independently of the other of said movable abutments responsively to charging of the independent application and release pipe, while vacuum in the vacuum brake pipe is at its preselected value, for causing operation of said valve means to provide in said brake cylinder pipe fluid at a pressure substantially equal to the pressure in said independent application and release pipe.

10. A combination fluid pressure and vacuum brake apparatus for a locomotive and connected cars of a train comprising, in combination, a vacuum source, a vacuum brake pipe for controlling automatic brakes on the locomotive and cars in unison and normally open to the vacuum source, a pair of control pipes, a relay valve device comprising means responsive to charging of one of said control pipes and venting of the other of said control pipes to cut off the vacuum brake pipe from the vacuum source and to connect the vacuum brake pipe to atmosphere for increasing absolute pressure of fluid in the vacuum brake pipe to cause an application of brakes on the locomotive and cars, responsive to subsequent concurrent charging of said control pipes to bottle up fluid in the vacuum brake pipe at a desired increased absolute pressure, and responsive to venting of said one control pipe and charging of said other control pipe to connect the vacuum source to the vacuum brake pipe for reducing absolute pressure in the latter to cause a release of brakes on the locomotive and cars, operator-controlled brake valve means for concurrently charging said control pipes with fluid at a pressure above atmospheric or selectively venting said control pipes to atmosphere for controlling operation of said relay valve device, a locomotive brake cylinder pipe, a normally vented independent application and release pipe for the locomotive chargeable with fluid at a selectable pressure above atmospheric, and brake controlling valve means for the locomotive controlled by absolute pressure in the vacuum source and pressure in the brake cylinder pipe opposing absolute pressure in the vacuum brake pipe and pressure in said independent application and release pipe and normally venting said brake cylinder pipe and responsive to an increase in absolute pressure in the vacuum brake pipe relative to its normally evacuated value, while said independent application and release pipe is vented, to provide in said locomotive brake cylinder pipe fluid at a pressure proportionate to such increase, said brake controlling valve means being responsive to said selectable pressure in said independent application and release pipe, while absolute pressures in the vacuum brake pipe and vacuum source are substantially equal, to provide in said locomotive brake cylinder pipe fluid at a pressure corresponding to said selectable pressure.

References Cited in the file of this patent
UNITED STATES PATENTS

| | | |
|---|---|---|
| 1,318,245 | Turner | Oct. 7, 1919 |
| 1,471,073 | Thomas | Oct. 16, 1923 |
| 1,919,404 | Whitaker | July 25, 1933 |